(12) United States Patent
Shelke et al.

(10) Patent No.: US 11,281,451 B2
(45) Date of Patent: Mar. 22, 2022

(54) DISTRIBUTED BACKUP AND RESTORATION IN VIRTUALIZED COMPUTING ENVIRONMENTS

(71) Applicant: VMware, Inc., Palo Alto, CA (US)

(72) Inventors: Prashant Shelke, Pune (IN); Yogesh Vhora, Pune (IN); Prachi Kurkute, San Jose, CA (US); Aleksandr Grinenko, East Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 75 days.

(21) Appl. No.: 16/914,537

(22) Filed: Jun. 29, 2020

(65) Prior Publication Data

US 2020/0326926 A1 Oct. 15, 2020

Related U.S. Application Data

(63) Continuation-in-part of application No. 16/773,926, filed on Jan. 27, 2020, which is a continuation of application No. 15/832,785, filed on Dec. 6, 2017, now Pat. No. 10,545,750.

(51) Int. Cl.
| | |
|---|---|
| *G06F 9/44* | (2018.01) |
| *G06F 8/65* | (2018.01) |
| *G06F 9/455* | (2018.01) |
| *H04L 41/082* | (2022.01) |
| *H04L 41/046* | (2022.01) |
| *H04L 43/10* | (2022.01) |
| *H04L 67/10* | (2022.01) |

(52) U.S. Cl.
CPC ............ *G06F 8/65* (2013.01); *G06F 9/45558* (2013.01); *H04L 41/046* (2013.01); *H04L 41/082* (2013.01); *H04L 43/10* (2013.01); *H04L 67/10* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,415,317 | B1 | 7/2002 | Yelon et al. |
| 6,938,021 | B2 | 8/2005 | Shear et al. |
| 9,760,597 | B2 | 9/2017 | Jiménez Peris et al. |
| 10,545,750 | B2 | 1/2020 | Pande et al. |
| 2011/0225574 | A1 | 9/2011 | Khalidi et al. |
| 2014/0236921 | A1 | 8/2014 | Belknap et al. |

(Continued)

OTHER PUBLICATIONS

VMware, "NSX-T Upgrade Guide", VMware NSX-T 2.0, Sep. 7, 2017.

*Primary Examiner* — Anna C Deng
(74) *Attorney, Agent, or Firm* — Su IP Consulting

(57) ABSTRACT

Example methods and systems to perform a distributed backup operation or a distributed restoration operation in a virtualized computing environment including a plurality of components and a plurality of policies are disclosed. One method may include identifying a component or a policy of the plurality of components or policies in response to receiving a first task associated with the distributed backup operation or the distributed restoration operation. In response to the first task associated with the distributed backup operation, the method include generating a backup file having a configuration of the component, but not any configuration of other components of the plurality of components, or a configuration of the policy, but not any configuration of other policies of the plurality of policies; and storing the backup file on a remote server.

18 Claims, 4 Drawing Sheets

(56) References Cited

U.S. PATENT DOCUMENTS

| | | |
|---|---|---|
| 2016/0127440 A1 | 5/2016 | Gordon |
| 2018/0241617 A1 | 8/2018 | Radzikowski et al. |
| 2019/0058631 A1 | 2/2019 | Zhou et al. |
| 2019/0158423 A1 | 5/2019 | Li et al. |
| 2019/0384651 A1 | 12/2019 | Newburn |
| 2020/0159520 A1 | 5/2020 | Pande et al. |

DISTRIBUTED BACKUP AND RESTORATION IN VIRTUALIZED COMPUTING ENVIRONMENTS

CROSS-REFERENCE TO RELATED APPLICATIONS

This application is a continuation-in-part under 35 U.S.C. § 120 of U.S. patent application Ser. No. 16/773,926, filed Jan. 27, 2020, which is a continuation under 35 U.S.C. § 120 of U.S. patent application Ser. No. 15/832,785, filed Dec. 6, 2017, now U.S. Pat. No. 10,545,750. The aforementioned U.S. patent applications are incorporated by reference in their entirety.

BACKGROUND

Unless otherwise indicated herein, the approaches described in this section are not admitted to be prior art by inclusion in this section.

Virtualization allows the abstraction and pooling of hardware resources to support virtual appliances in a virtualized computing environment. For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software defined networking, benefits similar to server virtualization may be derived for networking services. For example, logical overlay networks may include various components and be provided that are decoupled from the underlying physical network infrastructure, and therefore may be provisioned, changed, stored, deleted and restored programmatically without having to reconfigure the underlying physical hardware. In a logical overlay network with hundreds or thousands of components, it can be challenging to effectively perform backup and restoration operations, which may in turn result in operational difficulties and/or increased security risks.

DETAILED DESCRIPTION

Figure 1:
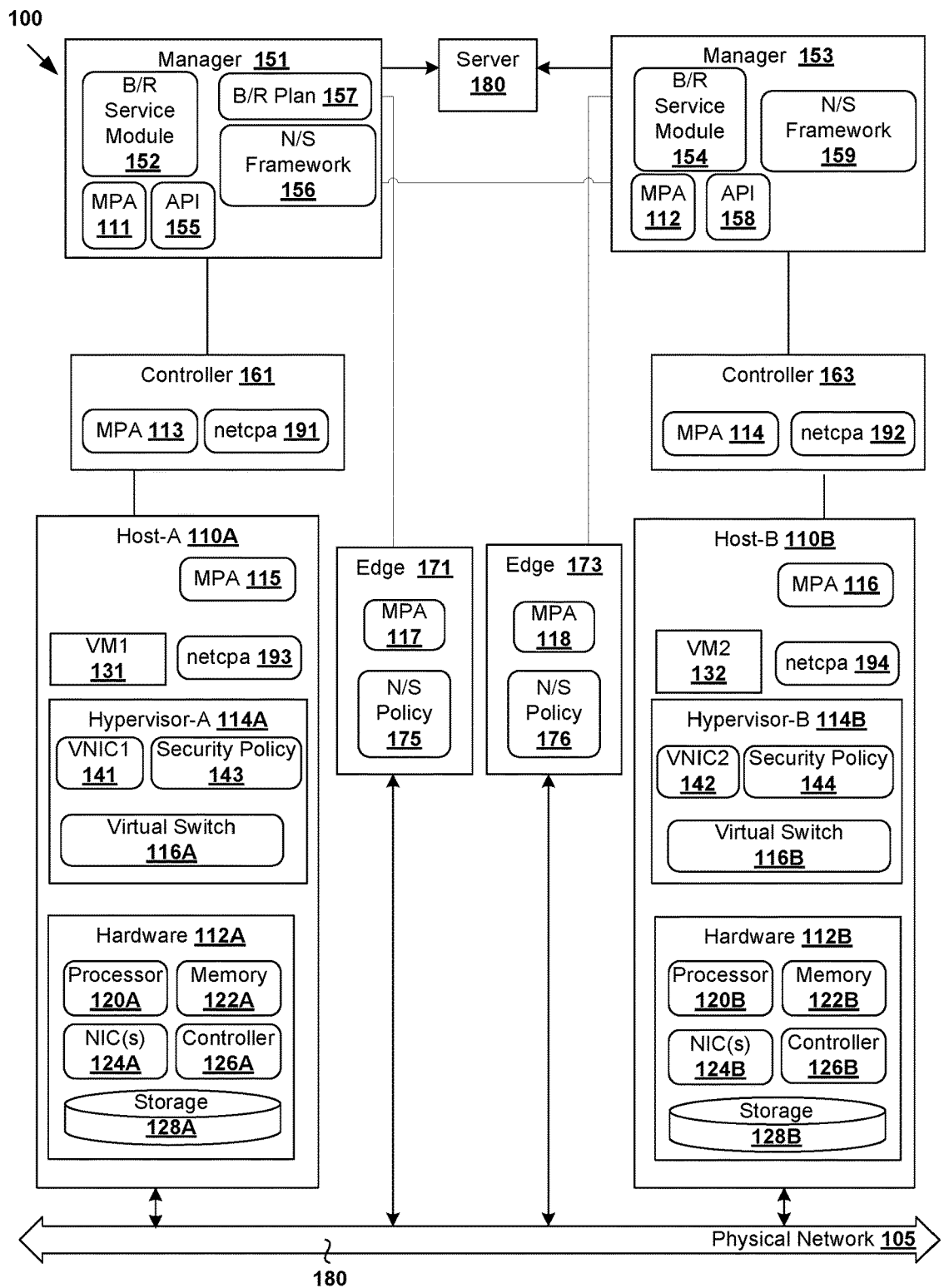
FIG. 1 is a schematic diagram illustrating an example virtualized computing environment in which a distributed backup operation or a distributed restoration operation may be implemented.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example virtualized computing environment 100 in which a distributed backup operation or a distributed restoration operation may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A and host-B 110B that are connected via physical network 105. Each host 110A/110B includes suitable hardware 112A/112B and virtualization software (e.g., hypervisor-A 114A and hypervisor-B 114B) to support virtual machines (e.g., VM1 131 and VM2 132). For example, host-A 110A supports VM1 131; and host-B 110B supports VM2 132. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B maintains a mapping between underlying hardware 112A/112B and virtual resources allocated to respective virtual machines 131/132. Hardware 112A/112B includes suitable physical components, such as central processing unit(s) or processor(s) 120A/120B; memory 122A/122B; physical network interface controllers 124A/124B; and storage disk(s) 128A/128B accessible via storage controller(s) 126A/126B, etc. To support guest operating systems and applications, virtual resources are allocated to the virtual machines. For example, corresponding to hardware 112A/112B, the virtual resources may include virtual CPU, virtual memory, virtual disk, virtual network interface controller (VNIC), etc. In the example in FIG. 1, VM1 131 and VM2 132 are associated with respective VNIC1 141 and VNIC2 142. Although one-to-one relationships are shown, one virtual machine may be associated with multiple VNICs (each VNIC having its own network address) in practice.

Hypervisor 114A/114B implements virtual switch 116A/116B to forward egress packets (i.e., outgoing or outbound) from, and ingress packets (i.e., incoming or inbound) to, the virtual machines. As used herein, the term "packet" may refer generally to a group of bits that can be transported together from a source to a destination, such as segment, frame, message, datagram, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 105 may include any suitable number of interconnected physical network devices, such as routers, switches, etc. Hypervisor 114A/114B also implements security policy 143/144 to provide network security functions, such as firewall, for VM1 131 and VM2 132.

Managers 151, 153, controllers 161, 163 and edges 171, 173 are components that facilitate implementation of software defined (e.g., logical overlay) networks in virtualized computing environment 100. Through network virtualization, logical overlay networks may be provisioned, changed, stored, deleted and restored programmatically without having to reconfigure the underlying physical hardware. A logical overlay network may be formed using any suitable protocol, such as Virtual Local Area Network (VLAN), Virtual eXtensible Local Area Network (VXLAN), Stateless Transport Tunneling (STT), Generic Network Virtualization Encapsulation (GENEVE), etc.

In some embodiments, an example logical overlay network may be implemented with an architecture having been built-in separation of a management plane, a control plane, and a data plane. The management plane provides secure concurrent entry points to the logical overlay network via a graphical user interface. The control plane is configured to track of the real-time virtual networking and security state of the logical overlay network. The data plane implements a number of capabilities to improve the performance and resiliency of the logical overlay network. In some embodiments, the management plane includes managers 151 and 153, the control plane includes controllers 161 and 163 and the data plane includes hosts 110A and 110B and edges 171 and 173.

Managers 151 and 153 may serve as an entry point for Representational State Transfer (REST) Application Programming Interface (API) for NSX, which facilitates automate deployment and management of components and policies in the logical overlay network. Some example policies in the logical overlay network include, but not limited to, security policy 143/144 and network and security (N/S) policy 175/176. Some example components in the logical overlay network include, but not limited to, controllers 161 and 163, edges 171 and 173 and hosts 110A and 110B. One example of managers 151 and 153 is the NSX manager component of VMware NSX® (available from VMware, Inc.) that operates on a management plane. Managers 151/153 may be implemented using physical machine(s), virtual machine(s), or both. Managers 151 and 153 may run management plane agent (MPA) 111 and 112, respectively. MPA 111 and 112 are configured to persist the state of virtualized computing environment 100 and communicate non-flow-controlling messages such as configurations, statistics, status and real time data among MPA 113 and 114 on controller 161 and 163, MPA 115 and 116 on hosts 110A and 110B, and MPA 117 and 118 on edges 171 and 173.

Controllers 161 and 163 may be members of a controller cluster (not shown for simplicity) that is configurable using managers 151 and 153, respectively. One example of controllers 161 and 163 is the NSX controller component of VMware NSX® that operates on a central control plane. Controllers 161/163 may be implemented using physical machine(s), virtual machine(s), or both. Controllers 161 and 163 may run control plane agent (netcpa) 191 and 192 to monitor the communications between controllers 161/163 and hosts 110A/110B. Similarly, hosts 110A and 110B also run netcpa 193 and 194 to validate the connections from hosts 110A/110B to controllers 161/163.

Edges 171 and 173 are configured to provide network edge security and gateway services in the example logical overlay network based on network and security (N/S) policy 175 and 176, respectively. One example of edge 171 and 173 is the NSX Edge component of VMware NSX® that operates on a data plane. In some embodiments, edges 171 and 173 may provide logical services in the logical overlay network. Some example logical services include, but not limited to, routing, network address translation, firewall, load balancing, L2 and L3 virtual private networks, and dynamic host configuration protocol (DHCP), domain name system (DNS) and internet protocol (IP) address managements.

Components (e.g., managers 151/153, controllers 161/163, edges 171/173 and hosts 110A/110B) and policies (e.g., security policies 143/144 and N/S policies 175/176) in the logical overlay network may be backed up or restored. The components and policies correspond to universal network and security objects. Manager 151 may be a primary manager which creates, deletes and updates the universal network and security objects. The universal network and security objects may be sharable and readable by a secondary manager (e.g., manager 153). However, the secondary manager cannot create, delete and update the universal network and security objects.

Conventionally, to perform a backup operation for the logical overlay network, a backup command is sent to manager 151 through a virtual appliance web interface or through an application programming interface (API) of manager 151 because manager 151 is primary and possesses all configurations of all the universal network and security objects. In response to receiving the backup command, manager 151 generates a backup file containing all configurations of all components and all policies in the logical overlay network, including, but not limited to, managers 151/153, controllers 161/163, edges 171/173, virtual switches 116A/116B, VNICs 141/142, N/S policy 175/176, security policy 143/144 and VMs 131/132. Manager 151 stores the backup file to server 180 that manager 151 can access.

In the event of a failure occurs in the logical overlay network, a restoration operation may be performed to restore the logical overlay network. In the restoration operation, manager 151 retrieves the backup file from server 180 and redeploys all components and policies of the logical overlay network in virtualized computing environment 100 based on the all configurations contained in the backup file.

However, in a multi-tenant data center with hundreds or thousands of clusters of appliances and workload hosts, constantly backing up configurations of all universal network and security objects or restoring all universal network and security objects for failures of only a few appliances and workload hosts become inefficient.

In some embodiments, manager 151 is configured as a master manager. In some embodiments, master manager 151 includes backup and restoration (B/R) service module 152 to coordinate a backup operation and/or a restoration operation of the logical overlay network in virtualized computing environment 100. Other manager (e.g., manager 153) in virtualized computing environment 100 may be configured as slave managers which are coordinated by master manager 151.

In some embodiments, master manager 151 runs B/R service module 152 that orchestrates a distributed backup operation or a distributed restoration operation for components and policies in virtualized computing environment 100. In some embodiments, master manager 151 is configured to call API 155 which is configured to call network and security (N/S) framework 156. N/S framework 156 includes a list of all components and all policies in the logical overlay network and all configurations of such components and policies. Based on the list, B/R service module 152 is configured to generate distributed backup and/or restoration (B/R) plan 157 for one or more components (e.g., manager 151/153, controller 161/163, edge 171/173 and host 110A/110B) and/or one or more policies (e.g., security policy 143/144 and N/S policy 175/176). Instead of all components and all policies of the logical overlay network, B/R plan 157 may only include a component, but not other components, and/or a policy, but not other policies, of the logical overlay network. In some embodiments, distributed B/R plan 157 lists out tasks of the distributed backup operation or the distributed restoration operation. B/R service module 152 may distribute the tasks in B/R plan 157 to B/R service module 154 on slave manager 153. Some example tasks include, but not limited to, backing up or restoring universal network and security objects associated with a cluster of the logical overlay network, backing up or restoring universal network and security objects associated with an inventory of the logical overlay network, backing up or restoring universal network and security objects associated with a node of the logical overlay network, backing up or restoring universal network and security objects associated with a policy of the logical overlay network and backing up or restoring universal network and security objects associated with a controller of the logical overlay network.

For illustration only, in some embodiments, in response to receiving a task of the distributed backup operation (e.g., backing up universal network and security objects of controller 163) from B/R service module 152 on master manager 151, B/R service module 154 is configured to call API 158 which is configured to call N/S framework 159. N/S framework 159 of slave manager 153 includes a copy of the list and configurations included in N/S framework 156. In response to the call from API 158, N/S framework 159 is configured to generate a backup file of a component, but not other components, or a policy, but not other policies, specified in the tasks received from B/R service module 152 according to the copy of the list and the configurations. For example, N/S framework 159 is configured to generate a backup file including a configuration of controller 163 based on the list and/or a configuration in N/S framework 159. B/R service module 154 is configured to call API 158 to encrypt and certify the backup file and store the backup file to server 180 that manager 153 can access. In some embodiments, the certification made by API 158 is specific to manager 153. B/R service module 154 is configured to report a status whether the backup file is successfully stored to server 180 to B/R service module 152 on master manager 151. Controller 163 is only for illustrations. Other components or policies in virtualized computing environment 100 may be similarly backed up.

For illustrations only, in some embodiments, in response to receiving a task of the distributed restoration operation (e.g., restoring universal network and security objects of controller 163) from B/R service module 152 on master manager 151, B/R service module 154 is configured to call API 158 to retrieve a backup file associated with controller 163 from server 180. API 158 is configured to decrypt the backup file. In addition, API 158 is also configured to perform an integrity check to the backup file based on the certification associated with API 158. API 158 is then configured to call N/S framework 159, which is configured to read the backup file and retrieve the configuration of controller 163 in the backup file. B/R service module 154 is configured to restore controller 163 based on the retrieved configuration. In addition, B/R service module 154 is further configured to report a status whether controller 163 is successfully restored to B/R service module 152 on master manager 151. Controller 163 is only for illustrations. Other components or policies in virtualized computing environment 100 may be similarly restored.

In some embodiments, master manager 151 is also configured to carry out one or more tasks of the distributed backup operation or the distributed restoration operation. More specifically, B/R service module 152, API 155 and N/S framework 156 on master manager 151 are configured to perform similar operations as B/R service module 154, API 158 and N/S framework 159 perform on slave manager 153, respectively.

Figure 2:
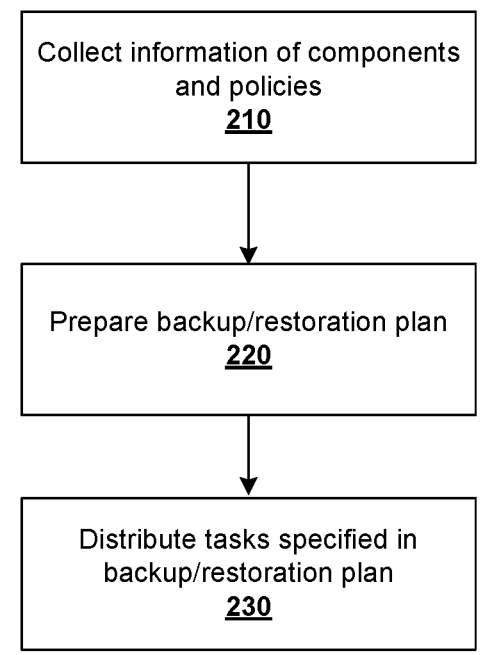
FIG. 2 is a flowchart of an example process of a master management node to perform a distributed backup operation or a distributed restoration operation in a virtualized computing environment.

FIG. 2 is a flowchart of an example process 200 of a master management node to perform a distributed backup operation or a distributed restoration operation in a virtualized computing environment. Example process 200 may include one or more operations, functions, or actions illustrated by one or more blocks, such as 210 to 230. The various blocks may be combined into fewer blocks, divided into additional blocks, and/or eliminated depending on the desired implementation. In practice, example process 200 may be performed by a master management node in a virtualized computing environment. One example management node may correspond to master manager 151 in FIG. 1.

At 210 in FIG. 2, in conjunction with FIG. 1, master manager 151 is configured to collect information associated with all components and/or all policies in virtualized computing environment 100. For example, master manager 151 is configured to generate a list of all components (i.e., managers 151/153, controllers 161/163, edges 171/173, virtual switches 116A/116B, VNICs 141/142 and VMs 131/132) and all policies (i.e., security policies 143/144 and N/S policies 175/176) in virtualized computing environment 100 based on the collected information. Master manager 151 is also configured to collect configurations of the all components and the all policies in the list. In some embodiments, the list and the configurations may be collected through communication among MPA 111-118.

At 220 in FIG. 2, in conjunction with FIG. 1, master manager 151 is configured to prepare B/R plan 157 to back up or restore a component or a policy in virtualized computing environment 100. Based on information collected at 210, master manager 151 may specify the tasks and the orders to carry out the tasks in B/R plan 157. For example, B/R plan 157 may include a first set of tasks to restore a certificate of a component in virtualized computing environment 100 and a second set of tasks to restore a database service of the component in virtualized computing environment 100. In some embodiments, to prevent the component from getting out of a cluster of the logical overlay network, B/R plan 157 may include an order of carrying out the first set of tasks prior to the second set of tasks.

At 230 in FIG. 2, in conjunction with FIG. 1, master manager 151 is configured to distribute the tasks specified in B/R plan 157 (prepared at 220) among various managers (e.g., managers 151 and 153) that run on the management plane of the logical overlay network. In some embodiments, master manager 151 may associate some tasks with a specific manager in B/R plan 157 to distribute the tasks among managers 151/153. In some embodiments, the association may be based on the workloads and capabilities of the managers 151/153. For example, in response to master manager 151 having less workloads and higher capabilities, more tasks may be associated with master manager 151, and less tasks may be associated with slave manager 153, or vice versa.

For example, master manager 151 may associate a third set of tasks to back up or restore VM1 131, VNIC1 141, virtual switch 116A, edge 171, controller 161, master manager 151, security policy 143 and N/S policy 175 with master manager 151, and a fourth set of tasks to back up or restore VM2 132, VNIC2 142, virtual switch 116B, edge 173, controller 163, manager 153, security policy 144 and N/S policy 176 with slave manager 153. In some embodiments, managers 151 and 153 may communicate with each other via a REST API channel so that master manager 151 may distribute the third and the fourth sets of tasks among master manager 151 and slave manager 153.

Figure 3:
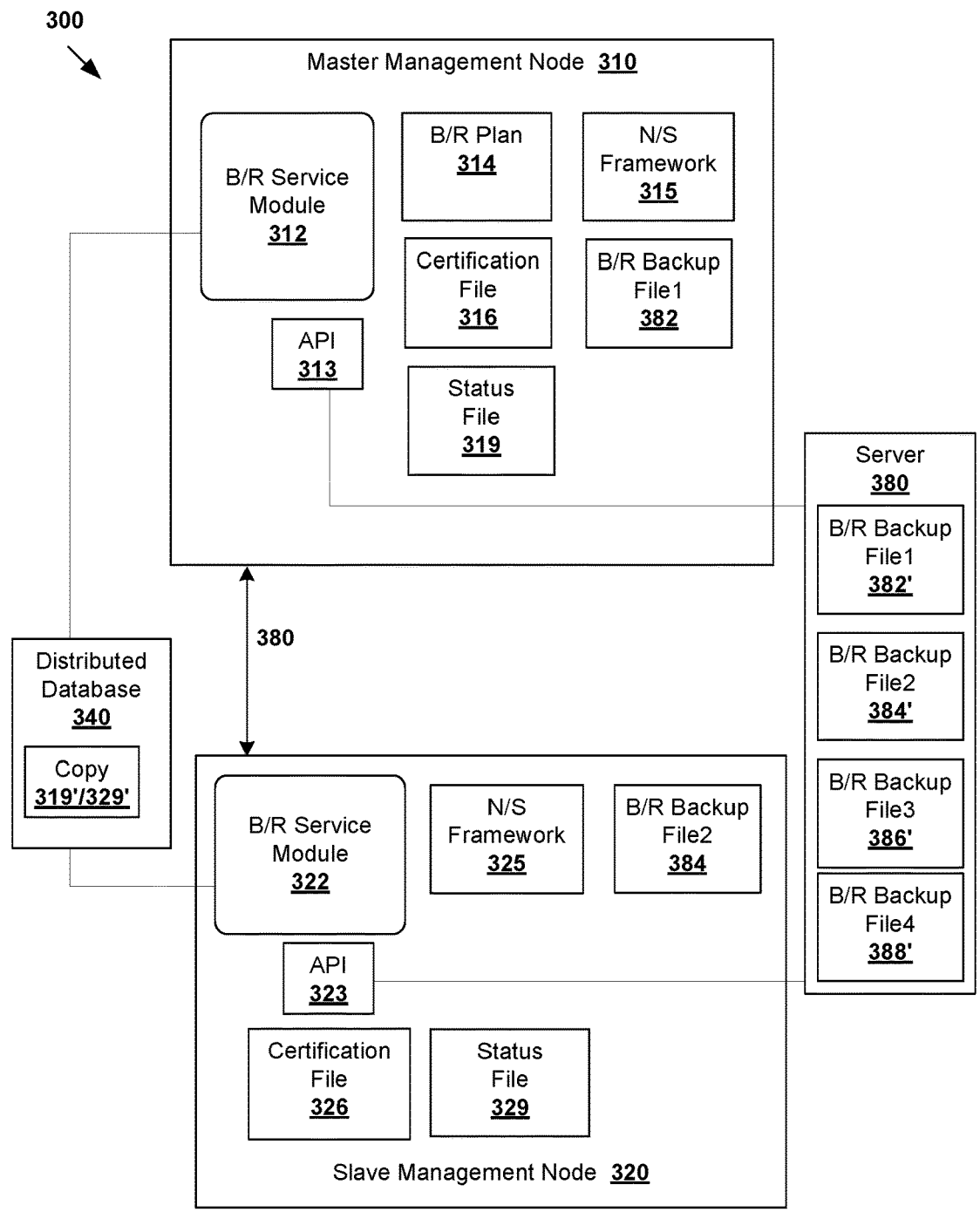
FIG. 3 is a schematic diagram illustrating a distributed backup operation or a distributed restoration operation involving master management node and slave management node in virtualized computing environment.

FIG. 3 is a schematic diagram illustrating a distributed backup operation or a distributed restoration operation involving master management node 310 and slave management node 320 in virtualized computing environment 300. Although single slave management node 320 is illustrated for simplicity, those skilled in the art will recognize that two or more slave management nodes 320 may exist in virtualized computing environment 300.

In some embodiments, in conjunction with FIG. 1, master management node 310 may correspond to master manager 151 and slave management node 320 may correspond to slave manager 153.

In some embodiments, master management node 310 includes B/R service module 312. B/R service module 312 is configured to orchestrate the distributed backup operation or the distributed restoration operation among management nodes in virtualized computing environment 300.

In some embodiments, master management node 310 may generate B/R plan 314 based on N/S framework 315. In conjunction with FIG. 1, N/S framework 315 may correspond to N/S framework 156 and includes a list of all components and all policies in a logical overlay network in virtualized computing environment 300 and configurations of such components and policies. B/R plan 314 may correspond to B/R plan 157. In some embodiments, master management node 310 may distribute tasks in B/R plan 314 to slave management node 320 via channel 380 (e.g., a REST API channel).

In some embodiments, slave management node 320 includes B/R service module 322, API 323 and N/S framework 325. In conjunction with FIG. 1, B/R service module 322, API 323 and N/S framework 325 may correspond to B/R service module 154, API 158 and N/S framework 159, respectively.

Distributed Backup Operation

In some embodiments, in response to receiving a first task of the distributed backup operation from B/R service module 312, B/R service module 322 is configured to call API 323 which is configured to call N/S framework 325. N/S framework 325 includes a copy of the list included in N/S framework 315 and configurations of the components and policies in the list. In response to the call from API 323, N/S framework 325 is configured to generate B/R backup file2 384 of a component, but not of other components in the logical overlay network in virtualized computing environment 300, specified in the first task. B/R backup file2 384 may include configurations of the component. In addition, the configurations include a certification file of the component for the component to synchronize with nodes in a cluster of the logical overlay network. In some embodiments, salve management node 320 is configured to access distributed database 340 and server 380 based on certification file 326 which is specific to slave management node 320. B/R service module 322 is configured to call API 323 to encrypt and certify B/R backup file2 384 and store a copy of B/R backup file2 384 (i.e., B/R backup file2 384') to server 380. B/R service module 322 is configured to record a status whether the first task is successful (e.g., whether B/R backup file2 384' is successfully stored on server 380) in status file 329. B/R service module 322 is then configured to store a copy of status file 329 (i.e., copy 329') in distributed database 340. According to copy 329' in distributed database 340, B/R service module 312 may track the backup progress of the component and display such progress on a user interface of master management node 310.

In some embodiments, similar to slave management node 320, master management node 310 is also configured to carry out a second task in the distributed backup operation to generate B/R backup file1 382 and to record a status whether the second task is successful (e.g., whether B/R backup file1 382' is successfully stored on server 380) in status file 319. B/R service module 312 is also configured to store a copy of status file 319 (i.e., copy 319') in distributed database 340.

In some embodiments, B/R service module 312 is configured to monitor the progress of the distributed backup operation by collecting task identifier information for tasks (e.g., the first task and the second task) having been distributed among management nodes 310/320. In some embodiments, in response to FAILED task identifier associated with a specific task, B/R service module 312 may redistribute the specific task to carry out the specific task again. In some embodiments, B/R service module 312 may stop distributing tasks if task identifiers of all tasks are SUCCESS.

In some embodiments, in response to a failure of master management node 310 (e.g., failure to transmit a heartbeat message to other managers), any of other management node (e.g., slave management node 320) in virtualized computing environment 300 may perform a failover process to use B/R service module 322 continuously to orchestrate the distributed backup operation based on copy 319' and 329' in distributed database 340.

Distributed Restoration Operation

In some embodiments, in response to receiving a first task of the distributed restoration operation from B/R service module 312 to restore a component/policy, B/R service module 322 is configured to call API 323 to retrieve a backup file (e.g., B/R backup file3 386') associated with the component/policy from server 380. The B/R backup file 3 include a configuration of the component/policy, but not any configuration of other components/policies. API 323 is configured to decrypt B/R backup file3 386' and call N/S framework 325 to read backup file3 386' to retrieve the configuration of the component/policy and a certification file of the component/policy, but not any configuration of other components/policies.

In some embodiments, B/R service module 322 performs a restoration operation of the component. The restoration includes, but not limited to, deploying a new node in virtualized computing environment 300 to represent the component/policy to be restored, restoring the retrieved certification file on the new node, and restoring the retrieved configuration on the new node in sequence. In some embodiments, the restoration further includes, prior to restoring the retrieved certification file and the configuration, blocking a synchronization between central control plane nodes and write APIs of the logical overlay network. In some embodiments, the restoration further includes, after restoring the retrieved certification file and the configurations, rebooting the new node and unblocking the synchronization between central control plane nodes and write APIs of the logical overlay network.

In some embodiments, B/R service module 322 is configured to record a status whether the task of the distributed restoration operation is successful (e.g., whether the component/policy is successfully restored) in status file 329. B/R service module 322 is then configured to store a copy of status file 329 (i.e., copy 329') in distributed database 340. According to copy 329' in distributed database 340, B/R service module 312 may track the restoration progress of the component/policy and display such progress on a user interface of master management node 310.

In some embodiments, similar to slave management node 320, master management node 310 is also configured to carry out a second task of the distributed restoration operation to retrieve B/R backup file4 388' associated with a policy, but not other policies, and to record a status whether the second task is successful (e.g., whether the policy is successfully restored) in status file 319. B/R service module 312 is also configured to store a copy of status file 319 (i.e., copy 319') in distributed database 340.

In some embodiments, B/R service module 312 is configured to monitor the progress of the distributed restoration operation by collecting task identifier information for tasks (e.g., the first task and the second task) having been distributed among management nodes 310/320. In some embodiments, in response to FAILED task identifier associated with a specific task, B/R service module 312 may redistribute the specific task to carry out the specific task again. In some embodiments, B/R service module 312 may stop distributing tasks if task identifiers of all tasks are SUCCESS.

In some embodiments, in response to a failure of master management node 310 (e.g., failure to transmit a heartbeat message to other managers), any of other management node (e.g., slave management node 320) in virtualized computing environment 300 may perform a failover process to use B/R service module 322 continuously to orchestrate the distributed restoration operation based on copy 319' and 329' in distributed database 340.

Figure 4:
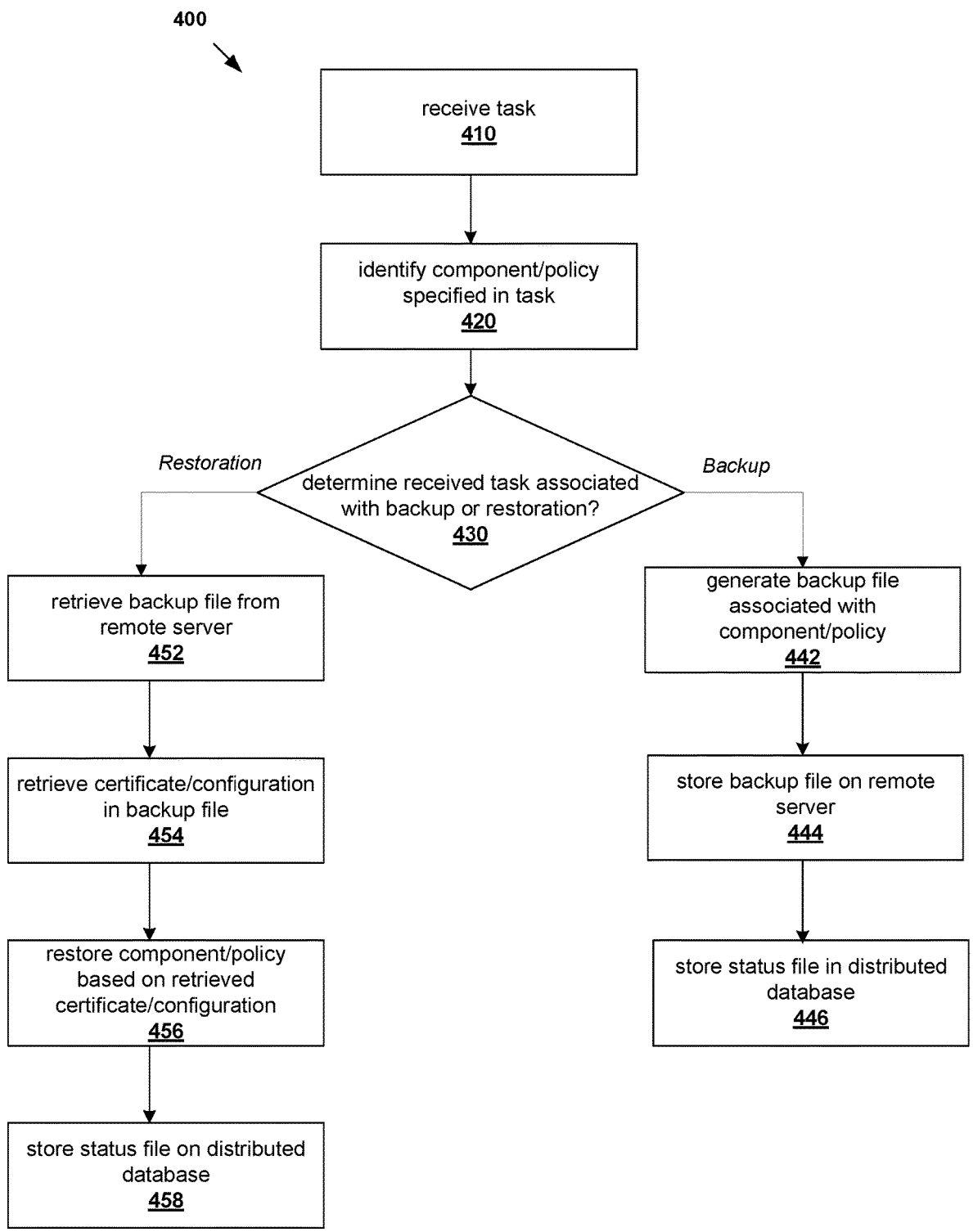
FIG. 4 is a flowchart of an example process of a management node to perform a distributed backup operation or a distributed restoration operation in a virtualized computing environment, all arranged in accordance with some embodiments of the disclosure.

FIG. 4 is a flowchart of an example process 400 of a management node to perform a distributed backup operation or a distributed restoration operation in a virtualized computing environment. Example process 400 may include one or more operations, functions, or actions illustrated by one or more blocks, such as 410, 420, 430, 442, 444, 446, 452, 454, 456 and 458. The various blocks may be combined into fewer blocks, divided into additional blocks, and/or eliminated depending on the desired implementation. In practice, in conjunction with FIG. 3, example process 400 may be performed by a master management node (e.g., management node 310) or a slave management node (e.g., management node 320) in a virtualized computing environment.

At 410 in FIG. 4, in conjunction with FIG. 3, management node 310/320 is configured to receive a task of the distributed backup operation or the distributed restoration operation. At 420 in FIG. 4, management node 310/320 is configured to identify a component or a policy specified in the task. At 430 in FIG. 4, management node 310/320 is configured to determine whether the received task is associated with the distributed backup operation or the distributed restoration operation.

In response to determining the task is associated with the distributed backup operation, at 442 in FIG. 4, management node 310/320 is configured to generate a backup file associated with the component, but not other components in virtualized computing environment 300, or the policy, but not other policies in virtualized computing environment 300, specified in the task. In some embodiments, the backup file includes a configuration or a certificate of the component or the policy.

At 444 in FIG. 4, management node 310/320 is configured to store the backup file on a remote server (e.g., server 380 in FIG. 3) that management node 310/320 can access.

At 446 in FIG. 4, management node 310/320 is configured to store a status file in a distributed database (e.g., distributed database 340) indicating whether the backup file is successfully stored on the remote server. The status file may be generated locally on management node 310/320 before management node 310/320 stores the status file in the distributed database.

In response to determining the task is associated with the distributed restoration operation, at 452 in FIG. 4, management node 310/320 is configured to retrieve a backup file associated with the component, but not other components in virtualized computing environment 300, or the policy, but not other policies in virtualized computing environment 300, specified in the task from a remote server (e.g., server 380 in FIG. 3).

At 454 in FIG. 4, management node 310/320 is configured to retrieve certificates and configurations associated with the component, but not other components in virtualized computing environment 300, or the policy, but not other policies in virtualized computing environment 300, included in the backup file.

At 456 in FIG. 4, management node 310/320 is configured to restore the component or the policy based on the retrieved configuration and certificate. More specifically, to restore the component or the policy, in some embodiments, management node 310/320 is configured to deploy a new node in the virtualized computing environment to represent the component to be restored, block a synchronization between central control plane nodes and write APIs of a logical overlay network associated with the component in the virtualized computing environment, restore the retrieved certificate on the new node, restore the retrieved configuration on the new node, reboot the new node and unblock the synchronization between central control plane nodes and write APIs.

At 458 in FIG. 4, management node 310/320 is configured to store a status file in a distributed database (e.g., distributed database 340) indicating whether the component or the policy is successfully restored. The status file may be generated locally on management node 310/320 before management node 310/320 stores the status file in the distributed database.

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 4. For example, the computer system may implement processes performed by managers 151/153 and management nodes 310/320.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management node to perform a distributed backup operation or a distributed restoration operation in a virtualized computing environment including a plurality of components and a plurality of policies, comprising:

in response to receiving a first task, identifying a component of the plurality of components or a policy of the plurality of policies specified in the first task;

determining whether the first task is associated with the distributed backup operation or the distributed restoration operation;

in response to determining that the first task is associated with the distributed backup operation, generating a backup file which includes a configuration of the component, but not any configuration of other components of the plurality of components, or a configuration of the policy, but not any configuration of other policies of the plurality of policies; and storing the backup file on a remote server;

in response to determining that the first task is associated with the distributed restoration operation, retrieving a backup file which includes a configuration of the component, but not any configuration of other components of the plurality of components, or a configuration of the policy, but not any configuration of other policies of the plurality of policies; and restoring the component based on the configuration of the component included in the backup file or the policy based on the configuration of the policy included in the backup file.

2. The method of claim 1, wherein the backup file further comprises a certificate of the component or the policy.

3. The method of claim 1, further comprising storing a status file in a distributed database accessible by the management node and other management nodes in the virtualized computing environment, wherein the status file indicates whether the first task is successful.

4. The method of claim 1, in response to determining that the first task is associated with the distributed backup operation, further comprising including a certificate of the component or the policy in the backup file.

5. The method of claim 1, in response to determining that the first task is associated with the distributed restoration operation, further comprising retrieving a certificate of the component or the policy from the backup file.

6. The method of claim 5, wherein restoring the component further includes deploying a new node in the virtualized computing environment, blocking a synchronization between a central control plane node and a write API associated with the component or the policy, restoring the certificate on the new node, restoring the configuration retrieved from the backup file on the new node, and unblocking the synchronization between the central control plane node and the write API associated with the component or the policy.

7. A non-transitory computer-readable storage medium that includes a set of instructions which, in response to execution by a processor of a computer system, cause the processor to implement a method for a management node to perform a distributed backup operation or a distributed restoration operation in a virtualized computing environment including a plurality of components and a plurality of policies, wherein the method comprises:

in response to receiving a first task, identifying a component of the plurality of components or a policy of the plurality of policies specified in the first task;

determining whether the first task is associated with the distributed backup operation or the distributed restoration operation;

in response to determining that the first task is associated with the distributed backup operation, generating a backup file which includes a configuration of the component, but not any configuration of other components of the plurality of components, or a configuration of the policy, but not any configuration of other policies of the plurality of policies; and storing the backup file on a remote server;

in response to determining that the first task is associated with the distributed restoration operation, retrieving a backup file which includes a configuration of the component, but not any configuration of other components of the plurality of components, or a configuration of the policy, but not any configuration of other policies of the plurality of policies; and restoring the component based on the configuration of the component included in the backup file or the policy based on the configuration of the policy included in the backup file.

8. The non-transitory computer-readable storage medium of claim 7, wherein the backup file further comprises a certificate of the component or the policy.

9. The non-transitory computer-readable storage medium of claim 7, wherein the method further comprises storing a status file in a distributed database accessible by the management node and other management nodes in the virtualized computing environment, wherein the status file indicates whether the first task is successful.

10. The non-transitory computer-readable storage medium of claim 7, in response to determining that the first task is associated with the distributed backup operation, wherein the method further comprises including a certificate of the component or the policy in the backup file.

11. The non-transitory computer-readable storage medium of claim 7, in response to determining that the first task is associated with the distributed restoration operation, wherein the method further comprises retrieving a certificate of the component or the policy from the backup file.

12. The non-transitory computer-readable storage medium of claim 11, wherein restoring the component further includes deploying a new node in the virtualized computing environment, blocking a synchronization between a central control plane node and a write API associated with the component or the policy, restoring the certificate on the new node, restoring the configuration retrieved from the backup file on the new node, and unblocking the synchronization between the central control plane node and the write API associated with the component or the policy.

13. A computer system configured to perform a distributed backup operation or a distributed restoration operation in a virtualized computing environment including a plurality of components and a plurality of policies, comprising:

a processor; and a non-transitory computer-readable medium having stored thereon instructions that, in response to execution by the processor, cause the processor to:

in response to receiving a first task, identify a component of the plurality of components or a policy of the plurality of policies specified in the first task;

determine whether the first task is associated with the distributed backup operation or the distributed restoration operation;

in response to determining that the first task is associated with the distributed backup operation, generate a backup file which includes a configuration of the component, but not any configuration of other components of the plurality of components, or a configuration of the policy, but not any configuration of other policies of the plurality of policies; and store the backup file on a remote server;

in response to determining that the first task is associated with the distributed restoration operation, retrieve a backup file which includes a configuration of the component, but not any configuration of other components of the plurality of components, or a configuration of the policy, but not any configuration of other policies of the plurality of policies; and restore the component based on the configuration of the component included in the backup file or the policy based on the configuration of the policy included in the backup file.

14. The computer system of claim 13, wherein the backup file further comprises a certificate of the component or the policy.

15. The computer system of claim 13, wherein the non-transitory computer-readable medium having stored thereon additional instructions that, when executed by the processor, cause the processor to store a status file in a distributed database accessible by the management node and other management nodes in the virtualized computing environment, wherein the status file indicates whether the first task is successful.

16. The computer system of claim 13, wherein the non-transitory computer-readable medium having stored thereon additional instructions that, when executed by the processor, cause the processor to, in response to determining that the first task is associated with the distributed backup operation, include a certificate of the component or the policy in the backup file.

17. The computer system of claim 13, wherein the non-transitory computer-readable medium having stored thereon additional instructions that, when executed by the processor, cause the processor to, in response to determining that the first task is associated with the distributed restoration operation, retrieve a certificate of the component or the policy from the backup file.

18. The computer system of claim 17, wherein the non-transitory computer-readable medium having stored thereon additional instructions that, when executed by the processor, cause the processor to deploy a new node in the virtualized computing environment, block a synchronization between a central control plane node and a write API associated with the component or the policy, restore the certificate on the new node, restoring the configuration retrieved from the backup file on the new node, and unblock the synchronization between the central control plane node and the write API associated with the component or the policy.

* * * * *